Sept. 2, 1930.  H. S. WALKER  1,774,740
STAND PIPE FITTING
Filed Oct. 27, 1928
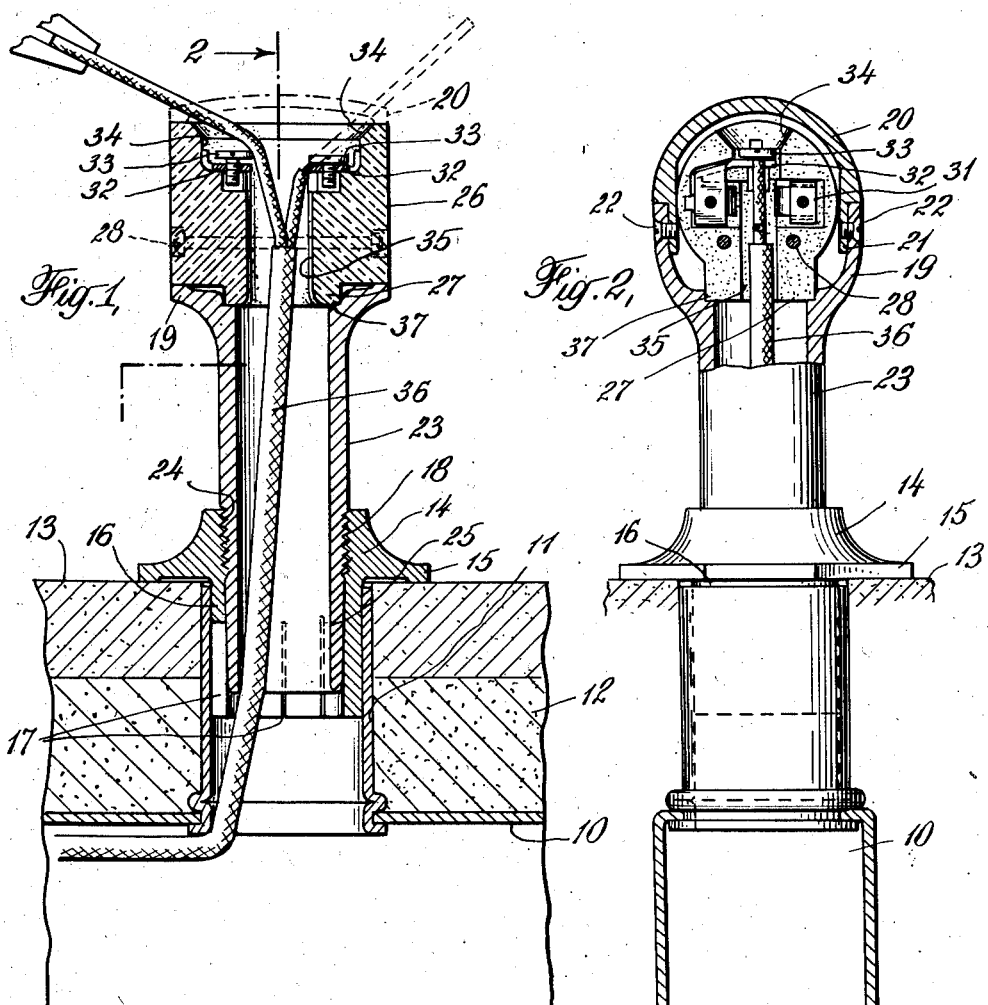
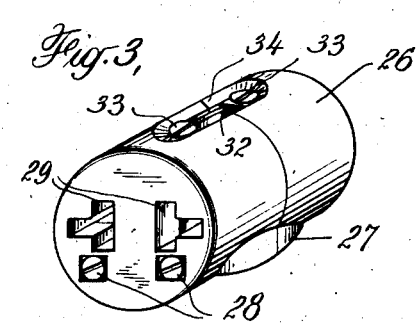
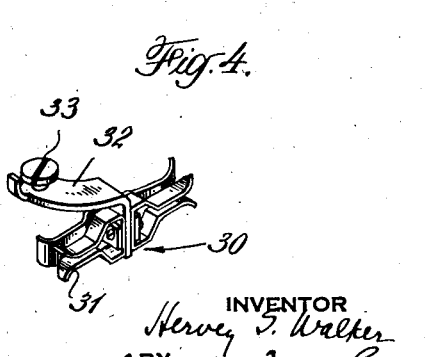
INVENTOR
Hervey S. Walker
BY
Pennie, Davis, Marvin & Edmonds
ATTORNEYS Patented Sept. 2, 1930

1,774,740

UNITED STATES PATENT OFFICE

HERVEY S. WALKER, OF ARDMORE, PENNSYLVANIA

STANDPIPE FITTING

Application filed October 27, 1928. Serial No. 315,420.

This invention relates to fittings for use in conduit wiring systems, and is concerned more particularly with a fitting of the type known as a stand-pipe for use in an underfloor installation.

In underfloor systems as used in modern office buildings, for example, it is the practise to embed the ducts within the floor structure during the formation thereof at a substantial distance below the finished floor surface. These ducts may be of steel construction and may have a plurality of tubular outlet fittings or inserts mounted in the duct wall at suitable intervals, these fittings extending upwardly to the floor surface and being closed by removable caps. The ducts in the different runs lead to boxes at the intersections, where electrical connections can be made, and when service is required at any point along the system, the cap in the nearest outlet is removed, and wires are fished through the outlet from the nearest box. At this outlet, the service connection is completed by the installation in the end of the outlet of a stand-pipe which extends upwardly from the floor a few inches, thus preventing water from entering the duct and also protecting the wiring.

When the connection is to high tension wiring for example, of 110 volts for lighting purposes, the standpipe used heretofore has commonly consisted of four main parts, a flanged sleeve with a slotted end which is inserted in the end of the outlet and lies with its flange flat on the floor, a pipe nipple which is screwed into the sleeve to expand the slotted end to cause it to be tightly held in place, a casing which is screwed on the upper end of the nipple and receives a receptacle, and a cover plate which is attached to the casing to hold the receptacle in place. The receptacle frequently used heretofore has included downwardly projecting binding posts which extend into the body of the casing, to which wires are connected, the presence of these posts requiring the use of an insulating sleeve in a part of the casing.

The construction above described has numerous disadvantages among which are the cost by reason of the number of parts which have to be provided with threads, and the difficulty of making an electrical connection to the binding posts of the receptacle. As these posts are on the underside of the receptacle, when a connection is to be made, the receptacle must be taken out of the casing, and the wires led out through the nipple and the casing to a length sufficient to permit attachment to the binding posts. The wires are then stripped of insulation, the attachment made, and the receptacle replaced in the casing. As the length of the wires necessary to permit attachment in the manner described is considerably greater than that necessary to lead from the box to the terminals when the receptacle is in place, this extra length of wire has to be pushed back through the fitting into the duct, where it coils or kinks. Such slack in the wire occupies a substantial amount of space in the duct and may seriously hamper later fishing operations incident to the making of other connections.

The fitting of the present invention overcomes these difficulties and may be made at substantially less cost, and installed with greater facility. With this fitting is employed a receptacle of novel design which includes terminals exposed to view when the cover of the fitting is removed and so disposed that connecting the wires thereto is a simple operation and does not require removal of the receptacle. In making the connection, the wires may be drawn as taut as may be desirable, and in any event, slack in the wires which would encumber the duct can readily be avoided.

The new stand-pipe includes a casing with a cover and an integral tubular extension threaded near one end and adapted to be received in the usual flanged floor plate. The casing with the cover plate in position is generally barrel-shaped with its ends open, and the body of the receptacle is received snugly in the casing, having a projection on one side entering a recess in the casing wall to prevent displacement. The receptacle may be of the double type, and of two parts secured together, each having the usual terminal sleeves for reception of the prongs of a plug. The wires are led through an opening extending entirely through the body of the receptacle from top to bottom, and these wires are separated a short distance from their ends and led to terminals in recesses in the top of the receptacle, one on each side of the opening.

With this construction, the cost of the fitting is substantially reduced since it is provided with only a single set of screw threads instead of three as in the former construction, and insulating sleeves or the like are not necessary, and the connection of the wiring to the receptacle can be made without leaving slack.

For a better undertsanding of the invention reference may be made to the accompanying drawings, in which Fig. 1 is a vertical sectional view through the new fitting installed, Fig. 2 is a sectional view on the line 2—2 of Fig. 1, Fig. 3 is a perspective view of the new receptacle, and Fig. 4 is a perspective view of a double terminal member used therein.

Referring now to the drawings, the duct 10 is shown as having a tubular outlet 11 mounted in its wall and extending through floor material 12 to the surface of the finished floor 13. In the upper end of the outlet is mounted the flanged sleeve 14, the flange 15 of which lies on the floor surface, while the end 16 of the sleeve enters the outlet. The sleeve is slotted as indicated at 17 and has internal screw threads 18 near its upper end.

The stand-pipe includes a casing 19 which with the cover plate 20 forms a housing generally of the shape of a barrel, the cover plate being held in place by a pair of lugs 21, one on each side which project into the casing and are attached thereto by means of small screws 22. From the side wall of the casing projects a tubular extension 23 formed integrally with the casing and provided with screw threads 24 spaced from its lower end. Beyond the threads, the end 25 of the extension is of less external diameter than the remainder of the extension, and this reduced end is to enter the sleeve 14 and expand the slotted end of the latter so that the sleeve is tightly wedged in the outlet 11.

The receptacle used in the new fitting is shown more clearly in Fig. 3. It is made of phenol condensation product or other suitable insulating material and includes a cylindrical body 26 with a short extension 27 from one side. The body is made up of two halves secured together by bolts 28 extending therethrough, and each half carries a part of the extension 27. The receptacle shown is of the double type, each half having recesses 29 in its flat end wall for the reception of the prongs of a plug. Each half also carries a double terminal member 30, which has leaves 31 received in recesses in the receptacle member to lie in registry with a recess 29. Each terminal member is double, so that it carries two sets of leaves one for each half of the plug. The member is also provided with a strap 32 with the usual binding screw 33, and this strap extends up through a suitable recess in the receptacle to enter another recess 34 in the top of the receptacle.

Extending through the receptacle from its top to the bottom of the extension 27 is an opening 35, this opening being defined by co-operating channels formed in the faces of the two halves. This opening is for the passage of the wires which are to be connected to the terminal straps 32 and the wires are shown in cable form at 36. The recesses 34, one in each half of the receptacle extend to the wall of the opening 35.

With the arrangement described, the making of a connection is a simple operation. After the wires have been fished through the duct and outlet, the cover plate 20 is removed, and the wires are led through the stand-pipe and through the opening 35. The stand-pipe is then threaded into the sleeve, and the wires drawn taut as may be desired. With the receptacle in position, one wire is stripped of insulation in the usual way and connected to a strap 32 by the screw 33. The second wire is then connected to the other strap, the cover plate restored to position and the connection is complete. It will be observed that making the connection does not require removal of the receptacle and the wires leading to the nearest box need not be substantially longer than required, so that there is no slack in the duct.

The housing defined by the casing and cover plate is of slightly greater internal diameter at its middle than the outer diameter of the receptacle to permit the use of the internal lugs 21 but at the ends the housing fits the receptacle snugly. In its lower wall in alignment with the opening through the tubular extension, the casing is provided with a shallow recess 37 into which the extension 27 of the receptacle is snugly received, thus preventing endwise and angular displacement of the receptacle in the housing.

Since the wiring is not stripped of its insulation except near its ends which lie in the opening in the insulating receptacle, the construction illustrated makes it possible to dispense with insulating sleeves and the like, the recesses 34 being sufficiently deep so that contact between the bare wires and the metal of the cover plate is avoided.

The stand-pipe is preferably made of brass and it lends itself readily to neat and attractive design. The construction illustrated is intended for use with a double receptacle, but if desired a single receptacle may be used in which event the opening at one end of the housing formed by the casing and cover will be closed by appropriate co-operating parts thereof.

What I claim:

1. A stand-pipe for use with a conduit wiring system which comprises the combination of a casing, a cover therefor extending from end to end of said casing and with the casing forming a substantially cylindrical hollow housing having at least one open end, a tubular extension from the casing in communication with the interior of the housing; a receptacle in the housing having an end exposed through said opening, said receptacle at said end having enclosed terminal members for the reception of the prongs of a plug; a pair of recesses in the body of the receptacle lying on opposite sides of the axis of the extension when the receptacle is in normal position in the housing, and a pair of binding posts, one in each recess, connected to said terminal members, said recesses lying in a part of said receptacle adjacent to and normally overlain by said cover whereby said posts are accessible without removal of said receptacle when said cover is removed.

2. A stand-pipe for use with a conduit wiring system which comprises the combination of a casing, a cover therefor extending from end to end of said casing at the top thereof and with the casing forming a hollow housing having at least one open end, a tubular extension from the side of the casing opposite to that where said cover lies, this extension being in communication with the interior of the housing, a receptacle in the housing having an end exposed through said opening, said receptacle at said end having enclosed terminal members for the reception of the prongs of a plug, co-operating parts on the receptacle and casing for preventing displacement of the receptacle when in normal position in the housing, and a pair of binding posts connected to said terminal members and mounted in the receptacle adjacent to and directly overlain by said cover when the latter is attached to the casing, whereby said posts are accessible without removal of the receptacle when the cover is removed.

3. A stand-pipe for use with a conduit wiring system which comprises the combination of an elongated casing, a cover therefor extending from end to end of the casing along the top thereof and with the casing forming a substantially cylindrical hollow housing having at least one open end, a tubular extension from the bottom of the casing for the passage of wires into the interior of the housing, a receptacle in the housing having an end exposed through said opening, and a pair of binding posts mounted in open recesses in the body of the receptacle to which said wires may be attached, said posts being overlain by said cover and accessible without removal of the receptacle when the cover is removed.

4. A stand-pipe for use with a conduit wiring system which comprises the combination of a casing, a cover therefor and extending from end to end of the casing along the top thereof and with the casing forming a substantially cylindrical hollow housing having at least one open end, a tubular extension from the casing for the passage of wires into the interior of the housing, a receptacle in the housing having an end exposed through said opening, said receptacle and housing having interengaging parts to prevent displacement of the receptacle, and a pair of binding posts in the body of the receptacle to which said wires may be attached, said winding posts lying in a part of the receptacle normally concealed by said cover and being accessible upon removal of the cover without removal of the receptacle.

5. A stand-pipe for use with a conduit wiring system which comprises the combination of a casing, a cover therefor extending from end to end thereof and with the casing forming a substantially cylindrical hollow housing having at least one open end, a tubular extension from the casing for the passage of wires into the interior of the housing, a receptacle in the housing having an end exposed through said opening, and a pair of binding posts in the body of the receptacle to which said wires may be attached, said binding posts lying in a part of said receptacle normally concealed by said cover and said posts being accessible upon removal of the cover without removal of the receptacle, the body of the receptacle having a passage for wiring in it communicating at one end with the tubular extension, the other end of the passage being closed by the cover when the latter is in position on the casing.

6. A stand-pipe for use with a conduit wiring system which comprises the combination of a substantially semi-cylindrical casing, a cover therefor extending from end to end of the casing and with the casing forming a substantially cylindrical hollow housing having at least one open end, a tubular extension from the casing for the passage of wires into the interior of the housing, said extension being provided at one end with means for mounting it in a part of said wiring system, a receptacle in the housing having an end exposed through said opening, a pair of binding posts in recesses in the body of the receptacle to which said wires may be attached, and a passage for wires through the body of the receptacle into which passage both of said recesses open.

7. A stand-pipe for use with a conduit wiring system which comprises the combination of a substantially semi-cylindrical casing, a cover therefor extending from end to end and with the casing forming a substantially cylindrical hollow housing having at least one open end, a tubular extension from the casing for the passage of wires into the interior of the housing, a receptacle in the housing having an end exposed through said opening, a pair of binding posts in recesses in the body of the receptacle to which said wires may be attached, and a passage for wires through the body of the receptacle into which passage both of said recesses open, one of said binding posts lying on each side of said passage.

8. A stand-pipe for use with a conduit wiring system which comprises a substantially semi-cylindrical casing, a cover therefor extending from end to end of the casing and with the casing forming a substantially cylindrical housing, a tubular extension integral with the casing and projecting from the side wall thereof, a receptacle in the housing having a vertical passage in the body thereof leading to the open end of said extension, and a binding post mounted in the body of the receptacle in a recess communicating with said passage, said binding post being normally overlain by said cover and accessible without removal of the receptacle when said cover is removed.

9. A stand-pipe for use with a conduit wiring system which comprises a substantially semi-cylindrical casing, a cover therefor extending from end to end of the casing and with the casing forming a substantially cylindrical housing, a tubular extension integral with the casing and projecting from the side wall near the middle thereof, a receptacle in the housing having a central vertical passage through the body thereof in communication with the interior of the extension, and a pair of binding posts in the body of the receptacle, one on each side of said passage, said binding posts being overlain by said cover when the latter is in position on the casing and being accessible without removal of the receptacle when said cover is removed.

10. A stand-pipe for use with a conduit wiring system which comprises a casing, a cover therefor and with the casing forming a housing, a tubular extension integral with the casing and projecting from the side wall thereof, a receptacle in the housing formed of two parts secured together and having channels in their opposed faces co-operating to form a passage through the receptacle leading to said extension, and a pair of binding posts in recesses, one in each part of the receptacle, each recess opening into said passage, said binding posts being overlain by said cover when the latter is in position on the casing and being accessible without removal of the receptacle when said cover is removed.

11. In a stand-pipe fitting, a receptacle housing substantially cylindrical in form having a cover extending from end to end of the housing and a receptacle in the housing, said receptacle having a straight passage through the body thereof, and a binding post in a recess in the body of the receptacle, said recess opening into the passage, and said post lying in a part of said receptacle normally overlain by said cover and being accessible when the cover is removed without removal of the receptacle from the housing.

12. A stand-pipe for use with a conduit wiring system which comprises the combination of a tubular member adapted to be mounted in communication with an outlet from said system, a hollow housing mounted on the end of the tubular member, this housing being substantially cylindrical in form with an opening in at least one end wall, and being in part made up of a removable portion extending from end to end of the housing, a receptacle in the housing having an end exposed through said opening and having at said end enclosed terminal members for the reception of the prongs of a plug, and a pair of binding posts connected to said members and mounted on the body of said receptacle in a part normally concealed by the removable portion of said housing whereby on removal of said portion said posts are accessible without removal of said receptacle.

13. In a wiring system, a conduit embedded in the floor and having an outlet fitting extending from the conduit toward the floor surface, a tubular member mounted to communicate with the conduit through the outlet fitting and extending above the floor surface, a semi-cylindrical casing integral with the upper end of said tubular member, a cover for said casing extending from end to end thereof and with the casing forming a housing, a receptacle in the housing having at least one end exposed through an opening at the end of the housing, and binding posts in the receptacle normally overlain and concealed by said cover, said binding posts being accessible upon removal of said cover without removal of the receptacle from the housing.

14. A stand-pipe for use with a conduit wiring system which comprises a casing substantially semi-cylindrical in form and having substantially straight side edges, a cover substantially semi-cylindrical in form and having substantially straight side edges, co-operating means on the cover and casing for securing the two together with their side edges in contact to form a hollow housing, a receptacle in the housing having an end exposed through an opening at one end of the housing, said receptacle having enclosed terminal members for receiving the prongs of a wiring plug, and a pair of binding posts connected to said terminal members and mounted in a part of the receptacle normally overlain by said cover, whereby removal of said cover exposes said posts.

15. A stand-pipe for use with a conduit wiring system which comprises a tubular support, a casing on one end of the support, this casing being substantially semi-cylindrical in form with substantially straight side edges, a cover substantially semi-cylindrical in form and having substantially straight side edges, said cover being adapted to be placed on said casing with the side edges of said parts in contact, whereby said parts form a substantially cylindrical housing, projections on one of said parts adapted to extend beyond the side edges of the second part when said parts cooperate to form the housing, means on the second part engaging said projections to secure said parts together, a receptacle in said housing having at least one end exposed through an opening in said housing, enclosed terminal members in said end of said receptacle adapted to receive the prongs of a wiring plug, and a pair of binding posts connected to said terminal members and mounted in a part of said receptacle normally overlain by said cover, whereby removal of said cover exposes said posts.

In testimony whereof I affix my signature.

HERVEY S. WALKER.